United States Patent [19]
DeRossett, Jr.

[11] Patent Number: 5,298,717
[45] Date of Patent: Mar. 29, 1994

[54] METHOD AND APPARATUS FOR LASER INSCRIPTION OF AN IMAGE ON A SURFACE

[76] Inventor: Thomas A. DeRossett, Jr., 7276 Sanctuary La., Amelia Island, Fla. 32034

[21] Appl. No.: 931,275

[22] Filed: Aug. 17, 1992

[51] Int. Cl.$^5$ .............................................. B23K 26/00
[52] U.S. Cl. .................................................. 219/121.68
[58] Field of Search ........... 219/121.7, 121.77, 121.68, 219/121.74; 346/76 L

[56] References Cited

U.S. PATENT DOCUMENTS

| | | | |
|---|---|---|---|
| 4,740,269 | 4/1988 | Berger et al. | 219/121.69 X |
| 4,772,774 | 9/1988 | Lejeune et al. | 219/121.69 |
| 4,791,267 | 12/1988 | Yokoyama et al. | 219/121.69 |
| 4,970,600 | 11/1990 | Garnier et al. | 219/121.69 X |
| 4,998,207 | 3/1991 | Postlewait | 219/121.69 X |

Primary Examiner—C. L. Albritton
Attorney, Agent, or Firm—John E. Vanderburgh

[57] ABSTRACT

Method and apparatus for scribing indicia into a surface using a laser as an emission source. Means are provided for controlling the beam scan over the surface being inscribed responsive to a digitized control signal representing the indicia. Laser power is controlled to avoid damaging the structural integrity of the glass. The system is suited for automation both for the input of data representing indicia and for the actual inscribing operation. The apparatus includes an emitter housing containing a laser and marking head for positioning the beam on the surface. The emitter housing further includes means for controllably directing the output beam to form the desired pattern in the surface and locating pins which cooperate with system circuitry to permit laser operation only when the emitter housing is properly located with respect to a surface being etched. A support system which includes a controller is provided which comprises means for data input and conversion of the input data into a control signal for controlling the laser.

12 Claims, 7 Drawing Sheets ns, the invention by which an image is inscribed into surface employing a laser generated high intensity beam. In accordance with
METHOD AND APPARATUS FOR LASER INSCRIPTION OF AN IMAGE ON A SURFACE

FIELD OF THE INVENTION

The invention relates to the inscription of images on a surface and more particularly to a method and apparatus for creating permanent images on glass and other inorganic oxide containing surfaces using high energy light.

BACKGROUND OF THE INVENTION

The inscription of images on various surfaces has become increasingly important in recent years for the permanent identification of valuable objects in addition to forming decorative designs on surfaces. For example, for the permanent identification of automobiles, trucks and the like, vehicle VIN Numbers or other identifying indicia are permanently inscribed on the windows of the vehicle at various locations to provide a non-removable identification for the vehicle. Many insurance companies offer a discount from the cost of insuring the vehicle if such permanent indicia are placed on the vehicle. Such indicia, for example a bar code, can also provide an access code for the retrieval of the history of the vehicle, such as for example its previous owner, its maintenance history and the like.

Conventionally, the inscription process is accomplished by mechanical or chemical means. For example, a malleable surface, such as wood, certain precious metals and the like, can be mechanically inscribed using a router or similar tool. These tools can be manually operated by persons possessing relatively high degree of skill or can be robotically controlled to mass produce inscriptions of various kinds on the malleable surface. However, manual operation is slow and not suited to repetitive operations while robotic equipment is expensive and can present a substantial maintenance problem.

In the case of hard surfaces such as glass, chemical etching utilizing a stencil is a common method employed for the inscription of indicia on the surface of the glass. A suitable etchant is placed on the back of the stencil and the etchant contacts the glass surface through the openings in the stencil. The etchant chemically attacks the surface to permanently etch an image corresponding to the stencil openings into the glass surface. Examples of such methods are represented by U.S. Pat. No. 4,585,514 granted Apr. 29, 1986 to L. Joe Scallan and U.S. Pat. No. 4,985,115 granted Jan. 15, 1991 to Thomas DeRossett. Both of these employ chemical etchants to etch an image into the surface of glass.

It is well understood, however, that glass and other inorganic oxide containing materials are relatively chemically resistant. Therefore, the etchant must be of a highly corrosive nature in order to react with the glass surface to form an image. Most of the etchant compounds are hydrogen fluoride based and as such, are highly corrosive and dangerous to use. Also, disposal of such materials can also be a serious problem in view of the potentially harmful environmental affect such materials may have. These materials must be treated as toxic substances and disposed of only at approved sites and transported in an approved manner. Needless to say the disposal of toxic materials is an expensive operation.

As an alternative to the chemical etch, sandblasting can be utilized as a method for etching glass and other similar surfaces. Sandblasting, if not properly carried out, also posses an environmental threat as well as a potential safety hazard to the operators and other personnel in the immediate area of the sandblasting operation. It is necessary to provide adequate protection for the operators of the sandblasting equipment as well as expensive air filtering apparatus to avoid air pollution violations.

Neither chemical etching nor sandblasting readily lend themselves to automation and in most cases, the indicia which can be etched onto the glass surface are limited to non-machine readable numbers. Moreover, poor technique, particularly in the case of chemical etching, can lead to erroneous results due to blurring of the etched image making it difficult to read, especially by machine. It must be noted, particularly in the case of automobile VIN numbers, that accuracy and image quality are of the utmost importance and mistakes require the replacement of the vehicle window or windshield, an expensive procedure.

SUMMARY OF THE INVENTION

As used herein, the terms etch and etching are defined as any process for the permanent inscription of an image into a surface be it a chemical or physical process, including the use of high energy light.

It is an object of the present invention to provide an improved method and apparatus for the laser inscription of indicia onto a surface.

Another object of the invention is to provide a method for etching glass and other inorganic oxide containing surfaces which eliminates the hazards of conventional chemical etching and sandblasting techniques.

Another object of the present invention is to provide apparatus for use with the improved method described herein.

Yet another object of the present invention is to provide a method and apparatus for etching surfaces utilizing high intensity light as inscribing agent.

Still yet another object of the present invention is to provide apparatus and method for etching surfaces which can be operated by a minimum of personnel in a safe and efficient manner.

Still yet another object of the invention is to provide a semi-automatic system for the application of identifying indicia on an automobile employing the method and apparatus of the invention.

These and other objects and features of the present invention are achieved by the present invention by which an image is inscribed into surface employing a laser generated high intensity beam. In accordance with the method of the invention, data (normally digital) representing an image, such as a VIN number, bar code, decorative design or the like, is input to a system controller for translation into a control signal which is transmitted to an emitter which includes a laser. The laser, in response to the control signal, emits a high intensity beam of light. The beam is controllably directed by the emitter onto the surface being etched to scribe an image representing the input data into the surface.

In one embodiment of the invention the surface being etched in accordance with the invention comprises glass or other inorganic oxide containing materials which may be transparent to the laser output. Accordingly, a laser having an emission to which glass is not transparent must be used. For example, eximer and $CO_2$ type lasers provide an emission beam which is highly effective for etching glass. In addition to the $CO_2$ and eximer laser, other laser emission sources, such as the YAG laser, are suited for use in this invention where the material being etched is not transparent to the emission beam. Such materials include wood, plastics and metal alloys. It will be understood, therefore, that the selection of laser emission source is a matter of choice depending upon the surface being etched as is well understood in the art.

The apparatus utilized to carry out the foregoing method includes an emitter housing in which the laser emmission source is located. The emitter housing further includes control means for controling the output beam to form the desired pattern. A marking head electronically and optically communicates with the emitter housing. Beam directing means in the marking head are electronically connected to the control means in the emitter housing to direct the beam from the emission end of the marking head over the surface to etch the desired pattern. Preferably, the marking head is provided with locating pins at the emission end which cooperate with system circuitry to permit laser operation only when the marking head is properly located with respect to a surface being etched. A support system is electronically connected to the emitter housing and includes a controller for data input and conversion of the input data into a control signal for the control means in the emitter housing.

The emision end of the marking head is preferably surrounded by a flexible hood which serves as a light seal to reduce light loss while the laser is in operation during the etching process.

In a preferred embodiment means are provided to circulate a fluid through the system to purge and cool the marker head and means are provided to draw a vacuum at the marker head during the etching process as an aid in securing the marker head against the surface being etched.

The emitter housing and marking head can be joined as a single unit in which case the emitter housing and the support system are preferably interconnected by a flexible line. The flexible line carries the electronic conductors and lines communicating with the vacuum system and fluid lines, if used, to permit the emitter housing to be easily moved from place to place during the etching operation. In another embodiment of the invention, the marking head is separate from the emitter housing and is carried by a flexible arm defining an enclosed optical path from the emitter housing for conducting the emission beam to the marker head.

The means for controllably directing the output beam includes suitable software at the controller for signalling the x and y coordinates of the emission beam. Responsive to the coordinates, the emission beam is directed over the target area to form the desired pattern. A preferred means for directing the emission beam comprises motor driven mirrors in the marker head which are placed in the path of the emission beam and rotate responsive to the control signal from the emitter housing to reflect the emission beam in an x and y direction over the surface being etched responsive coordinate signals to form the desired image.

Other objects and advantages of the present invention will become apparent from the following detailed description taken in conjunction with the drawings.

DETAILED DESCRIPTION OF THE INVENTION

Figure 1:
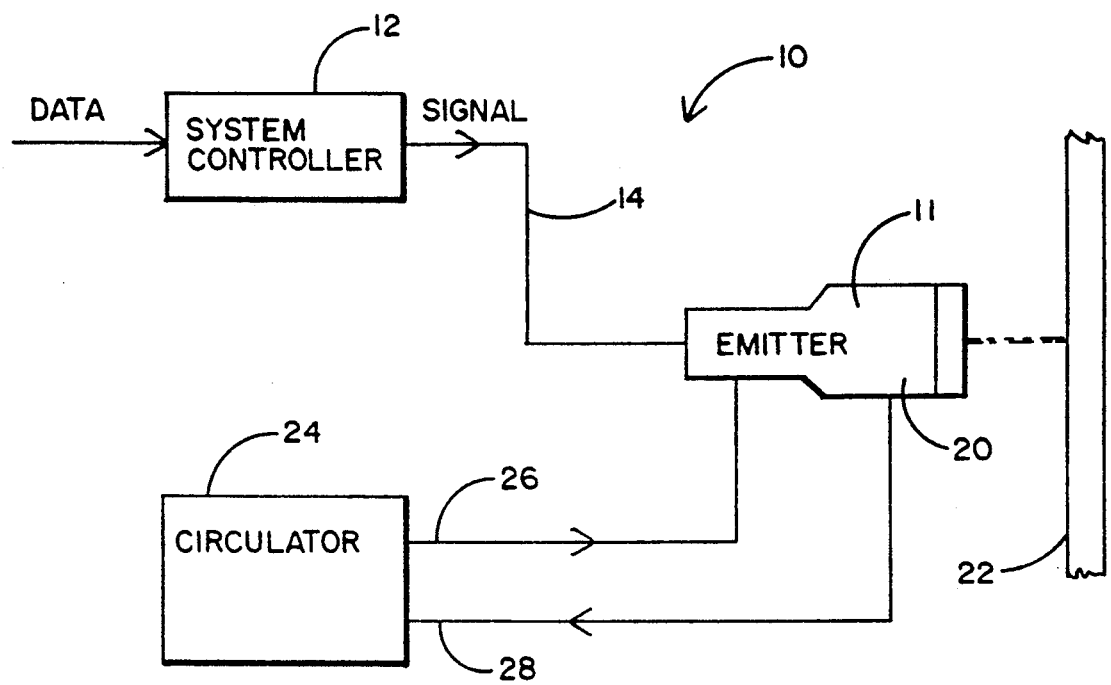
FIG. 1 is a schematic diagram of the $CO_2$ laser etching system of the present invention.

The invention is described herein in connection with the inscription of indicia on vehicle windows. The apparatus of the present invention is schematically illustrated in FIG. 1 and includes a support system 10, shown in broken line having a system controller 12 adapted to receive data i.e., an automobile VIN number. The controller 12 is a computer, such as a Motorola 68000 processor, to which data may be input manually by a conventional keyboard or by automated systems, such as barcode readers and the like. The system controller 12 converts the data input to suitable digital control signal comprising an address code and command code for the operational components of the system 10. The signal is output through a line 14 to an emitter 11 which includes a $CO_2$ laser 18 and means, described in detail below, for controllably scanning the emission beam of the laser 18 over a surface 22 being etched. In response to the control signal from the system controller 12, the $CO_2$ laser 18 emits a high intensity light beam to which glass is opaque. The emission power of the $CO_2$ laser preferably ranges between 10 watts and 20 watts. $CO_2$ lasers having power of less than 10 watts do not generate a beam of sufficient power to etch a glass surface, while those in excess of 20 watts produce a beam powerful enough to penetrate the glass surface too deeply and thus weaken the structural integrity of the glass composition. This is particularly important in the case of automotive safety glass which utilizes laminated safety glass and if the beam is too powerful, it can penetrate to the "butyl layer" and substantially reduce the structural integrity of the safety glass. It is preferred that the $CO_2$ laser 18 have an output on the order of 20 watts generate a beam of sufficient amplification to overcome interference due to condensation, dust, dirt and the like, which may collect on the reflecting mirrors and lens of the optical system.

In the embodiment illustrated in FIG. 1, as is conventional with many laser systems, a nitrogen circulator 24 is provided which includes a reservoir for nitrogen gas and a circulation pump to circulate nitrogen through the emitter housing 16 through lines 26 and 28. The circulation of nitrogen through the system 10 purges moisture, dust and other deleterious substances from the interior of the emitter housing 16 for protection of the optical system in the emitter housing. The nitrogen circulator may also incorporate a heat exchanger to cool the circulated gas for cooling the laser 18 and other components of the emitter housing 16. It will be understood, however, that due to the speed of the etching process, overheating is not a serious problem even in the absence of the cooling fluid. In addition, the optics can be manually cleaned as required to maintain proper functioning of the laser system. Thus, the apparatus will operate satisfactorily without any type of gaseous purge or coolant.

Figure 6:
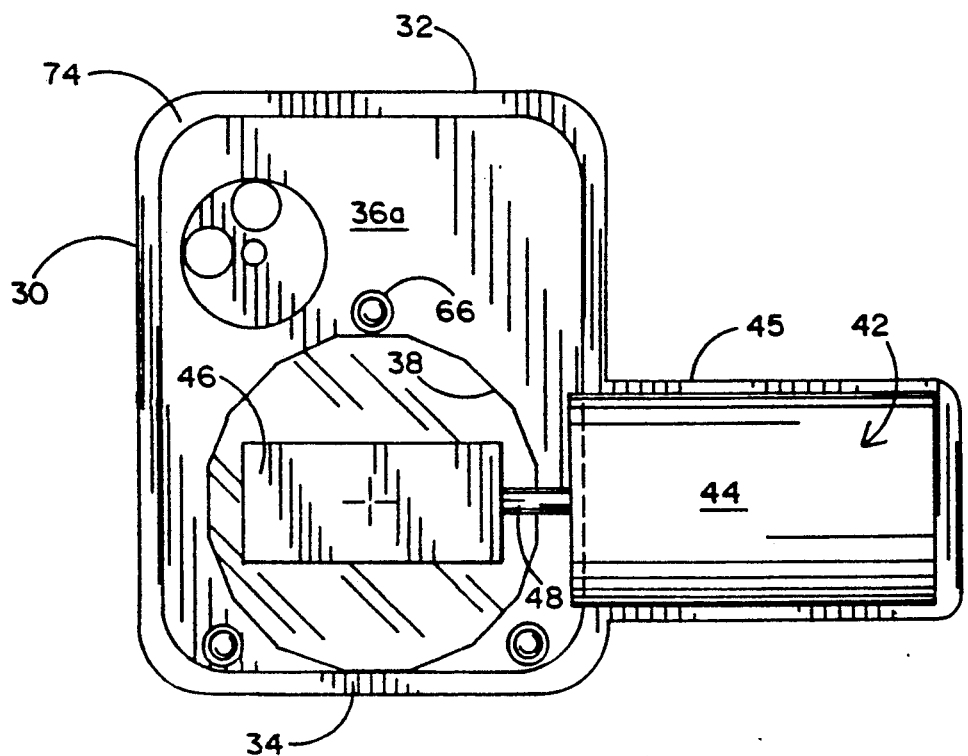
FIG. 6 is a front elevation of the emitter head viewed from the emission end.
Figure 2:
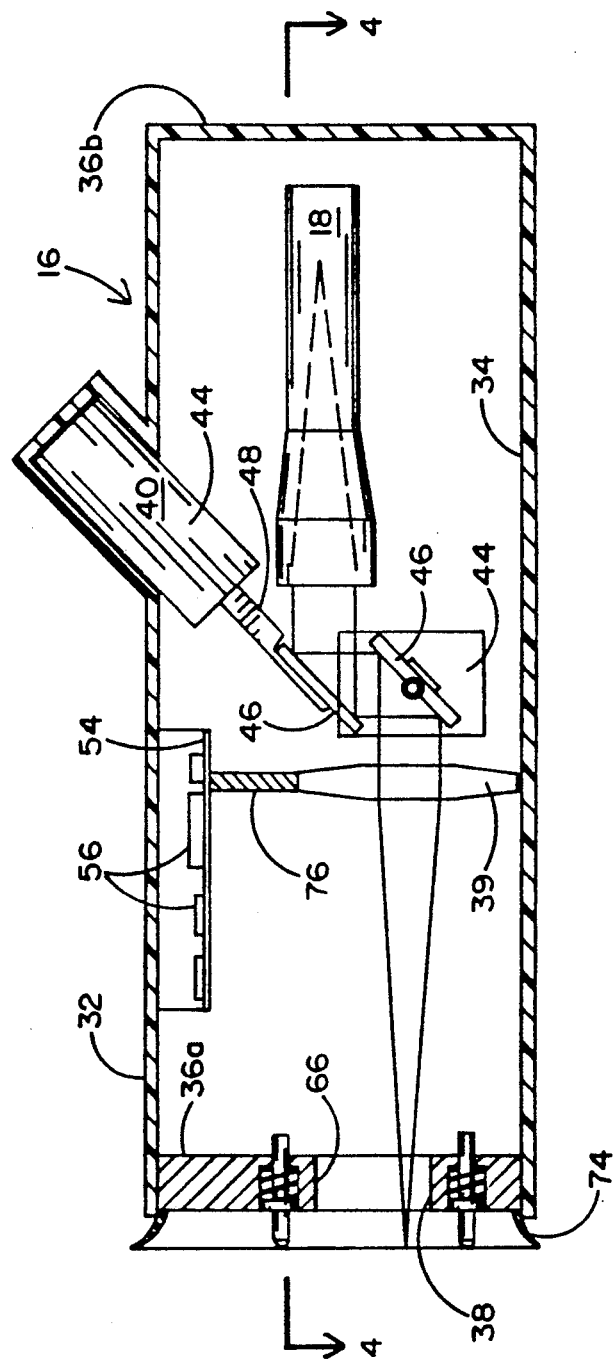
FIG. 2 is a side elevation in section of an emitter used in the system of FIG. 1.
Figure 3:
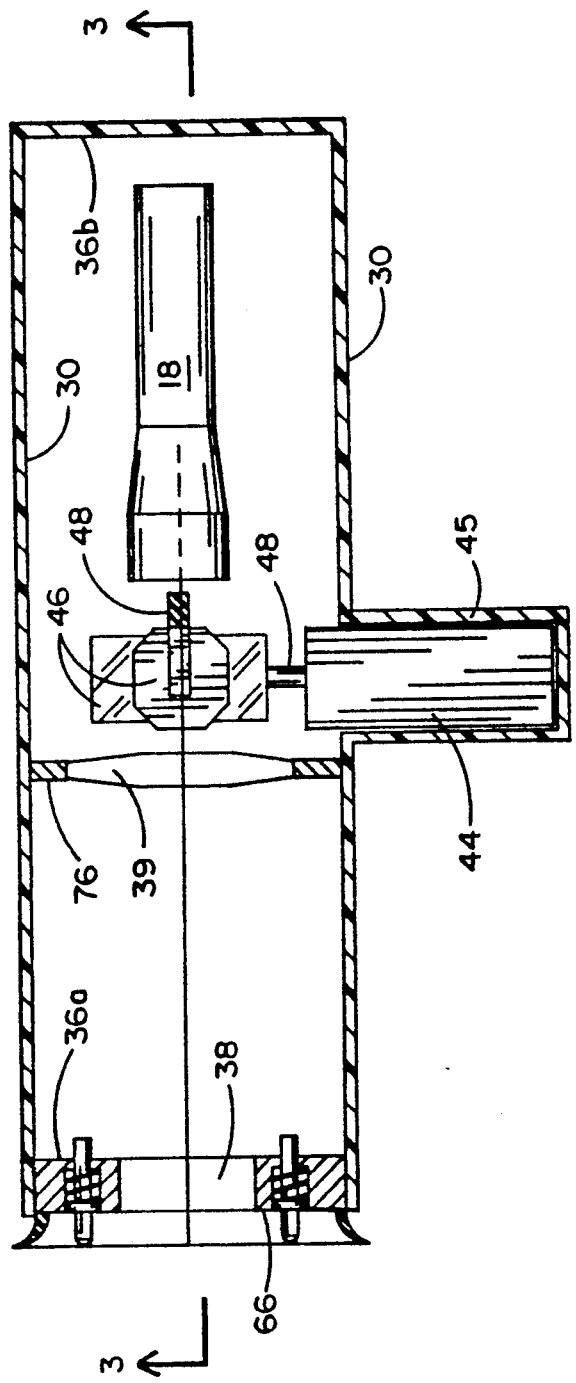
FIG. 3 is a top plan view in section of the emitter of FIG. 2.
Figure 4:
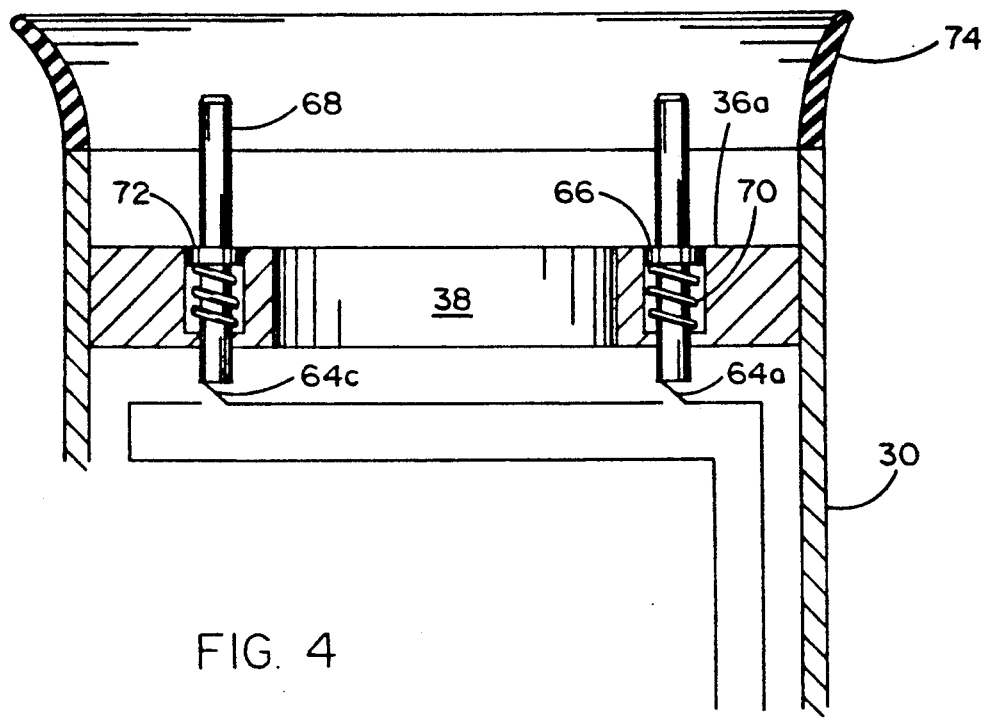
FIG. 4 is a side sectional elevation in enlarged scale illustrating the emission end of the emitter housing.

Referring now to FIGS. 2, 3 and 6, the emitter 11 includes a housing 16 which consists of a hollow case, the interior of which is defined by side walls 30, a top wall 32, a bottom wall 34 and end walls 36a and 36b. The end wall 36a and a portion of the side walls 30 adjacent the end wall 36a define a marking head 37. The end wall 36a is provided with a port 38 for the laser emission beam. A lens 39 is positioned in the housing 16 to focus the emission beam from the laser 18.

A laser 18 capable of emitting a beam to which the surface being etched is not transparent is disposed in the interior of the emitter housing 16. An eximer or $CO_2$ laser is preferred for use in the present invention because the emission of these lasers is particularly suited for etching oxide containing surfaces such as glass, anodized aluminum, ceramic oxides and the like. In particular, glass is not transparent to the $CO_2$ beam so that the laser 18 is able to etch the glass surface. The emissions from other types of lasers will not etch glass because glass is transparent to the emission beam of such lasers and the beam passes through the glass without etching the surface.

The means 20 for controllably directing the emission beam from the laser 18 over the surface 22 being etched are referred to herein as the X galvos 40 and the Y galvos 42 arranged in the emitter housing 16 to direct the emission beam in an X and a Y direction respectively.

The X galvos 40 includes a motor 44 and a rotatable mirror 46 carried by linkage 48 to the motor 44 for rotation about an axis parallel to the emission beam as it is output from the laser. In addition a position sensor, 50 (FIG. 7) is incorporated in the circuitry of the X galvos 40 to control the motor 44 for positioning the mirror 46 responsive to the signal from the system controller. The Y galvos 42 similarly includes a rotatable mirror 46 connected by linkage 48 to a motor 44 for rotation of the mirror 46 about an axis perpendicular to the emission beam as it is output from the laser 18. The Y galvos 42 also includes a position sensor 50 for positioning the mirror 46. The top wall 32 and side wall 30 are extended at 45 to receive and house the motor 44 of the X galvos 40 and Y galvos 42 respectively.

The mirror 46 of the X galvos 40 is disposed in the path of the emission beam of the laser 18 and reflects the emission beam to the mirror 46 of the Y galvos 42. The mirror 46 of the Y galvos 42 reflects the beam through the focusing lens 39 to the emission end of the emitter housing 16. The focusing lens 39 is formed of a material transparent to the $CO_2$ laser 18 beam. Germanium is one such material which can be used to with good results to form the lens. Rotation of the mirror 46 of the X galvos 40 causes the beam to be moved in an X direction on the surface being etched and the rotation of the Y galvos 42 moves the beam in the Y direction. It should be clear that the position of the X and the Y galvos 42 mirrors can be reversed so that the emission beam from the laser 18 contacts the mirror 46 of the Y galvos 42 first.

The output signal of the system controller 12 is carried by a flexible cable 52 to a circuit control board 54 in the emitter housing 16. Surface mounted components on the control board 54 are schematically shown as 56.

Figure 7:
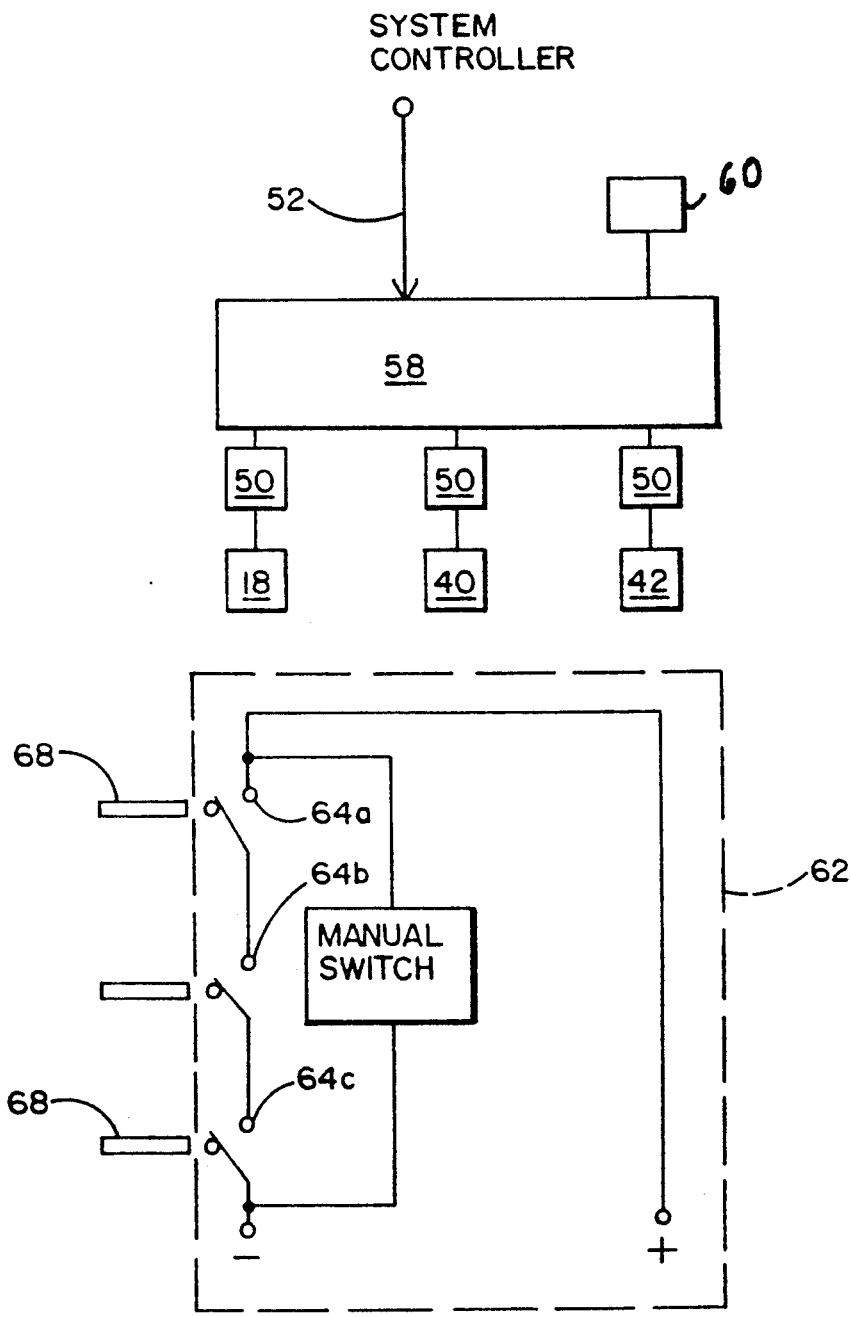
FIG. 7 is a schematic diagram of circuitry in the $CO_2$ laser etching system of the present invention.

Referring to FIG. 7, the control circuitry includes a suitable shift register 58 and clock 60 which operate in a manner well known in the art to receive the signal from the system controller 12 and to transmit the signal to the appropriate operating components, i.e., the laser 18 and the position sensors of the X galvos 40 and the Y galvos 42. The incoming signal may be in the form of timed pulses. The incoming signal thus contains the necessary commands to position the mirrors for scanning the beam over the surface 22 being etched and to control the duration of the emission from the laser.

A power circuit, shown generally as 62, supplies power to the laser 18 and the X galvos 40 and Y galvos 42. Normally open safety switches 64a, 64b, and 64c, are provided in the circuit and the circuit is not made and the laser 18 cannot be operated until all three of the switches 64a, 64b, and 64c are closed.

As most clearly illustrated in FIGS. 3 and 6, the end wall member 36a defines the emission end of the marking head 27 and includes three openings 66 each having a shoulder defined therein for mounting a spring 70. Each of the openings 66 receive a locator pin 68. Each locator pin 68 is slidably received in its respective opening 66 with one end extending outwardly from the wall member 36a and the opposite end extending in to contact one of the switches 64a, 64b, or 64c. The mounting spring 70 acts against a collar 72 on the pin 68 to normally urge the locator pin 68 outwardly so that the switches 64a, 64b, and 64c are in their normal open position breaking the power circuit 62. When the emission end of the marking head 27 of the emitter 11 is properly located adjacent the surface 22 to be etched, the locator pins 68 are depressed against the urging of the spring 70 and the inner ends cause the switches 64a, 64b, and 64c to be closed to complete the power circuit 62 and permit operation of the emitter 11.

Figure 5:
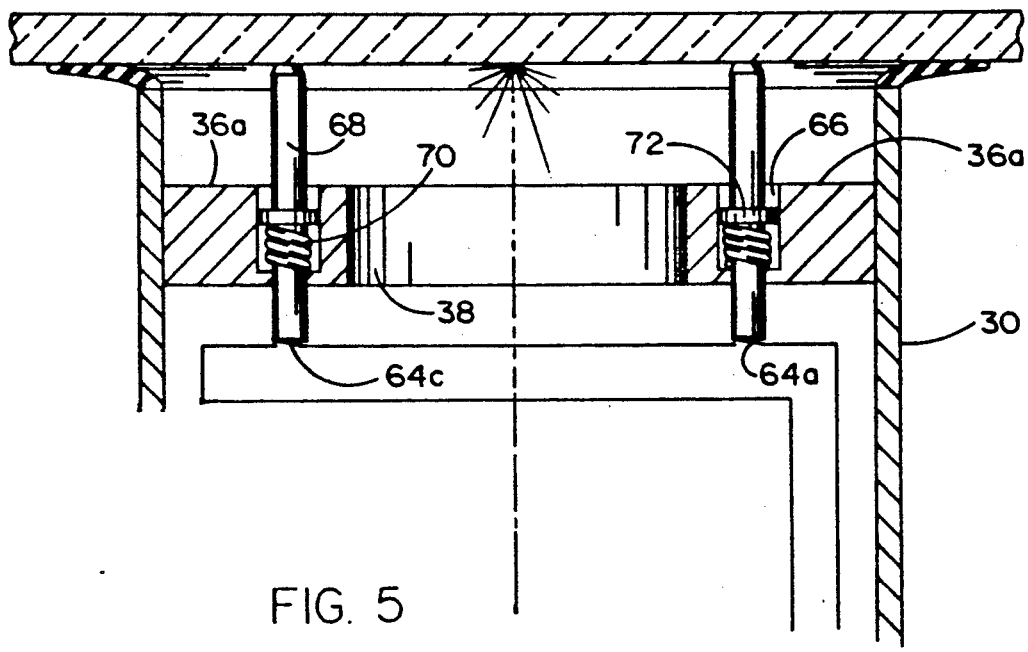
FIG. 5 is a side sectional view similar to FIG. 4 showing the marking head portion of the emitter housing in its operational position adjacent a surface to be etched.

A resilient hood 74 surrounds the marking head 27. The hood 74 serves as a light seal when the emitter housing 16 is positioned for etching operations (FIG. 5). As a further aid for positioning the emitter 11 and hood 74, a vacuum pump (not shown) may be utilized in place of or in addition to the nitrogen circulator 24 for reducing pressure within a space defined by the surface being etched, the interior of the hood and the interior of the housing 16. Reduction of pressure in the defined space causes the hood 74 to be drawn tightly against the surface to aid in drawing the emission end of the emitter housing 16 sufficiently close to the surface to be etched to cause the locator pins 68 to close the switches 64a, 64b and 64c of the power circuit 62. The vacuum system finds use in an automated etching process such as where the etching system of the invention is employed in conjunction with robotics.

In either embodiment using the nitrogen purge or vacuum systems, it is highly desireable to seal at least a portion of the interior of the emitter housing. In the embodiment illustrated in FIGS. 2 and 3, a gasket 76 surrounds the lens 39 to form a sealed compartment within the emitter housing. The portion of the interior of the case forward of the lens 39 and gasket 76 toward the emission end is normally open to the exterior of the emitter housing and forms a portion of the defined space in which pressure is reduced. The remainder of the interior of the housing 16 being sealed need not be incorporated within the defined space. Sealing the interior of the housing 16 also reduces the effect of a dirty environment on the mirrors 46 and the laser 18.

In the embodiment described herein, the system controller 12 is separated from the emitter housing 16 and is connected by a flexible cable 52 which carries the control signal from the system controller 12 to the emitter housing. The flexible cable 52 can also carry the nitrogen lines for the nitrogen purge system and the vacuum tube of the vacuum system where such are employed. The system controller 12 is a microprocessor of conventional design such as for example a readily available personal computer. Data input is normally by way of the keyboard 54 connected to the microprocessor. In an alternative embodiment, a bar code reader (not shown) may be connected for reading data into the microprocessor. This is highly convenient where data such as the VIN number or the like is placed in the form of a bar code on routing paperwork which can be read by the bar code reader and input to the microprocessor for etching onto the automobile glass. It will be understood that a microprocessor can be mounted on the exterior of the emitter housing 16 or alternatively in its interior and need not be a separated from the emitter housing. All that is required is the means for entering data representing an image and the microprocessor for generating the control signal as has been described.

The invention thus far has been described in connection with the embodiment in which the marking head 27 in integrally formed as part of the emitter housing 18. However, for high production inscription of indicia, such as applying the VIN numbers on vehicular glass surfaces, it is preferred to separate the marking head 27 from the emitter housing 18 to provide a lighter unit which is easily moved.

Figure 8:
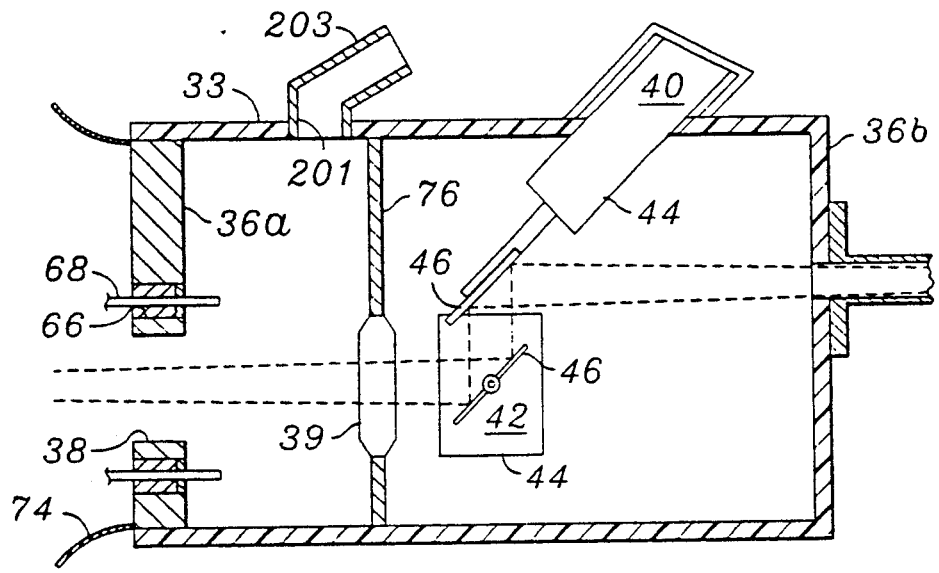
FIG. 8 is a side sectional view of a marking head as separated from the emitter housing.
Figure 9:
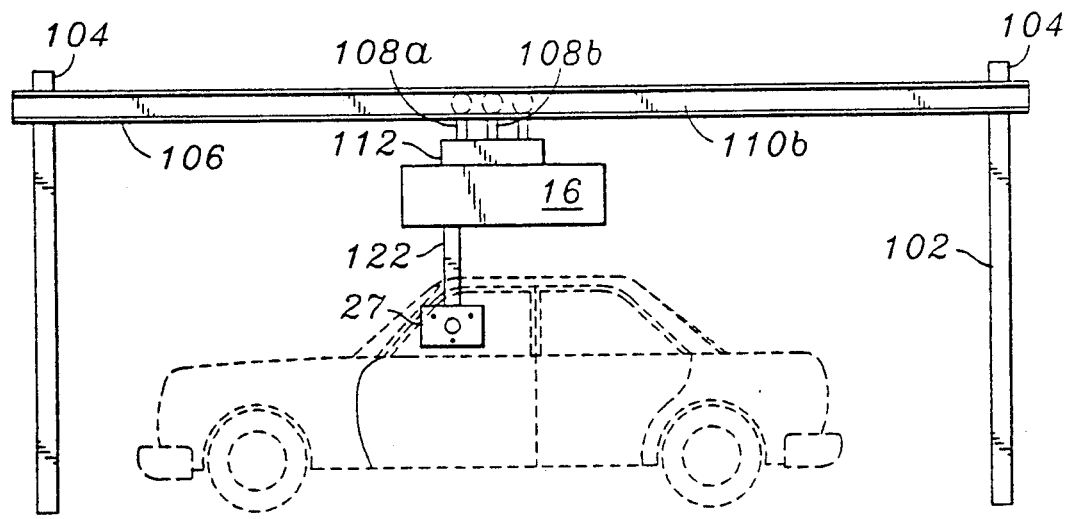
FIG. 9 is a side view of apparatus for a system for the application of identifying indicia on vehicles.
Figure 10:
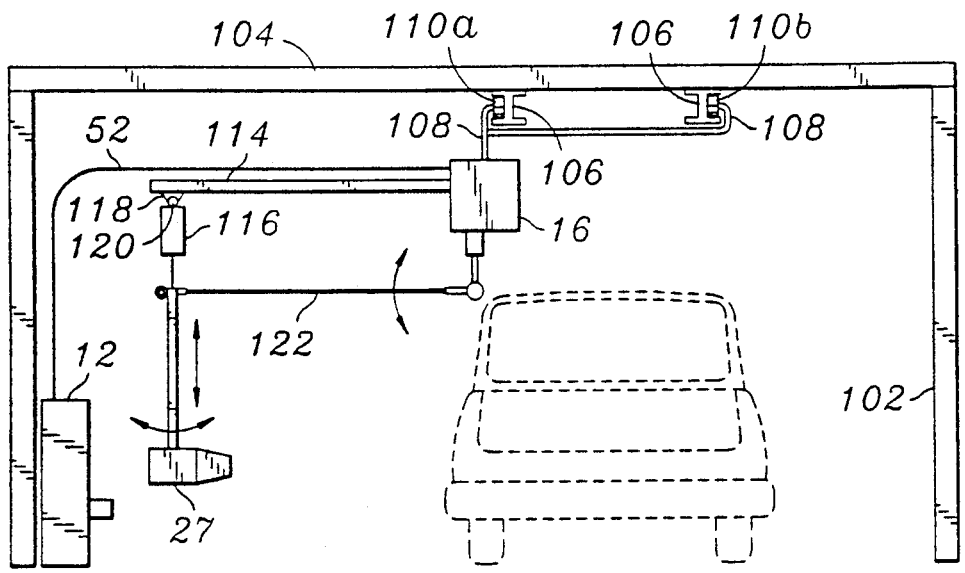
FIG. 10 is a front view of the apparatus of FIG. 9.

As illustrated in FIGS. 8-10 where like reference numbers denote like parts, apparatus for high production inscription of indicia comprises a frame having four support legs 102, a pair of cross members 104 extending between the upper ends of the support legs and two longitudinally extending, parallel I-beams 106a and 106b are secured at their opposite ends to a cross piece to provide structural rigidity to the frame and support for the emitter housing 16. The frame dimensions are selected to permit a vehicle to be driven through the longitudinal dimension of the frame. The emitter housing 16 is carried on the I-beams 106 by trolleys 108a and 108b mounted in tracks 110a and 110b defined between the flanges of the I-beams 106a and 106b respectively. A mounting plate 112 is secured to the top wall 32 of the emitter housing 16 and the trolleys 108a are secured directly to the mounting plate. The trolley 108b primarily stabilizes the emitter housing 16 and is provided with an arm which extends from the trolley 108b to the mounting plate 112. A swing arm 114 is pivotally connected at one end to the mounting plate 112 and carries a spring loaded pulley and cable assembly 116 for the vertical adjustment of the marking head 27 which secured to the cable. Horizontal positioning of the marking head 27 is provided by a second cable 118 secured along the bottom surface of the swing arm 114 to which the pulley and cable assembly 116 is movably attached by means of a roller 120.

As illustrated, the marking head 27 is separated from the emitter housing 16. The marking head 27 (FIG. 8) consists of a separate container 33 in which are contained the x galvos 40 and the y galvos 42 for the emission beam from the laser 18. The lens 39 is located adjacent the galvos mirrors 46 and is carried by the gasket 76 which, as previously described, partitions and seals the interior of the marking head 27. The emission end of the marking head 27 at wall 39a includes the emission port 38 and the spring loaded locator pins 68. A port 201 in the top wall of the vacuum line provides communication between the interior of the marking head 27 and a line 203 leading to the circulator 24 for creating reduced pressure, circulating a purging or cooling fluid or both.

Figure 11:
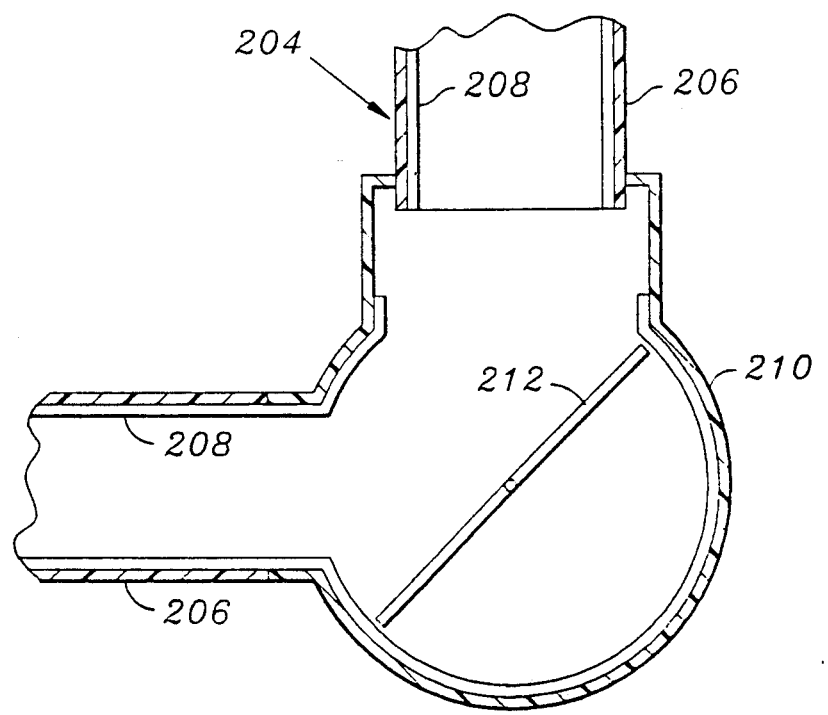
FIG. 11 is a portion of the articulated arm of FIG. 10.

The emitter housing 16 contains the laser 18 and the circuit control board 54 containing the circuitry illustrated in FIG. 7. The laser emission is conducted through a flexible optical path from the laser 18 to the marking head 27. In the embodiment illustrated the optical path consists of an articulating arm 204 (FIG. 11) consisting of several sections of hollow tube 206 having an emission beam reflective inner surface 208. The tubes 206 are are pivotally connected by a knuckle joint 210 in which a mirror 212 is pivotally fixed for rotation with respect to one of the sections being connected for reflection of the incident emission beam from one section to another irrespective of the relative positions of the sections. Flexible optical fibers can also be employed as an alternative to the articulating arm 204 although the articulating arm provides the preferred flexible optical path for use with the $CO_2$ laser employed for etching glass.

The system controller 12 is located to one side of the frame at a point which is convenient for the operator for the imput of data and the like. The circulator (not shown) may also be located along the side of the frame and connected to the emitter housing 16 by a pair of fluid hoses for circulation of cooling fluid. In cool climates it will be understood that it is normally unnecessary to cool the emitter housing 16. Control signal leads and power cables for powering the galvos motors 44 lead from the emitter housing to the marking head 27 and can be supported by the swing arm 114. A vacuum system (not shown) which is automatically activated along with the laser 18 when the locator pins 68 close the switches 64 when the marking head is properly positioned on the surface to be etched.

For the purposes of description, the method of the invention will be described in connection with the etching of a vehicle VIN number on the desired locations on the windshield and side window and automobile. The VIN number is input to the system controller 12 via a keyboard or in the alternative via a bar code reader which is read a bar code which contains the desired data. The system controller 12 converts the input data to a digitized control signal which comprises timed signal pulses for controlling the laser 18 and the x and y galvos as described above. The emission end of the marking head 27 is placed adjacent the surface to be etched so that the locator pins 68 are in contact with the surface 22 and are retracted to close the switches 64a, 64b and 64c to permit operation of the $CO_2$ laser 18. When the emitter housing 16 is properly positioned adjacent the surface 22 to be etched as determined by the locator pins 68, the vacuum system automatically is activated and the emission end of the marking head 27 is drawn securly against the surface being etched to prevent light leakage and to insure that the marking head does not move during the etching process. In addition, the $CO_2$ laser 18 is activated to begin emission of a beam and the position sensors 50 activate the galvos motors to locate the reflecting mirrors 46 of the X and Y galvos, 40 and 42, in the proper plane to cause the beam to be scanned across the surface to be etched in the desired pattern to create on the surface of the glass the VIN number. When the pattern has been completed the control signal turns the $CO_2$ laser 18 off and the emitter housing 16 can be moved on the trolleys 108 along the tracks 110a and 110b and the marking head 27 also moved by means of the swing arm 114 to a new location to etch either a new pattern or repeat the previous pattern.

From the foregoing it will be seen that the method and apparatus of the present invention provides a quick, safe, and environmentally acceptable method for etching glass which lends itself to automated production operations. The method of the invention eliminates the necessity for sandblasting and/or chemical treatment of the glass and the attendant hazards connected therewith. In addition, the method is readily carried out by a single individual rather than several individuals as required by the chemical or the sandblasting methods. The power of the $CO_2$ laser 18 can be readily controlled to avoid any structural damage to the surface being etched and the process is relatively fast, on the order of a few seconds compared to minutes with the chemical sandblasting techniques.

As will be understood by those skilled in the art, various arrangements other than those described in detail in the specification will occur to those persons skilled in the art, which arrangements lie within the spirit and scope of the invention. It is therefore to be understood that the invention is to be limited only by the claims appended hereto.

I claim:

1. In a system for inscribing a pattern on a surface, said system consisting of an emitter including a laser for generating a high energy emission beam, a support system including a system controller for receiving data representing the pattern to inscribed on the surface and for converting said data to control signals, and beam direction means for controllably directing said emission beam responsive to the control signals from said system controller and power circuit means connecting said laser and said beam direction means to a source of power, the improvement comprising:

a marking head separate from said emitter and said system controller and adapated to be moved and positioned adjacent said surface to be etched, said marker head including a housing having an interior defined by top, bottom, side and end walls, one of said end walls defining the emission end of said marker head and having an emission port for the passage of the laser beam therethrough, said beam direction means being disposed in the interior of said marking head for directing said beam through said emission port, a hood surrounding said emission end of said marking head which serves as a light seal between said emission end of said marking head and the surface to reduce light loss while said laser is in operation;

means defining a flexible optical path between said emitter and said marking head for transmitting said emission beam from said laser to said marking head;

circuit means electrically connecting said marking head and said laser.

2. The apparatus of claim 1 further including means for reducing pressure in the space defined by the emission end of said marking head, said hood and the surface being etched.

3. The apparatus of claim 1 wherein said beam direction means comprises first and second motor driven mirrors disposed in said marking head in the path of said emission beam, said first mirror reflecting said emission beam to said second mirror and said second mirror reflecting said beam to said focusing means, said first and second mirrors being rotated to direct said emission beam in an x and y direction on said surface being etched responsive to said control signal and includes a position sensor for controlling the position of said first and said second mirrors responsive to said control signal.

4. The apparatus of claim 1 wherein said emission end of said marking head is provided with at least one opening in which a locator pin is spring mounted, said locator pin being retractable therein and normally urged outwardly by said spring, said locator pin having an outer end extending outwardly from said wall member for contact with said surface being etched and an inner end extending into said interior of said emitter, said locator pin being retracted against the urging of said spring as said emitter is moved toward said surface and said outer end contacts said surface to be etched, said inner end operating to close a switch in said power circuit means thereby to complete said power circuit for operation of said laser.

5. The apparatus of claim 1 further including a frame comprising support legs and cross member extending therebetween, a pair of parallel track members extending longitudinally between said cross members, a carrier for said emitter longitudinally movable supported by said track members by trolleys movable along said track members and said emitter carried thereby, a swing arm pivotally secured at one end to said carrier, said swing arm movably carrying a spring loaded pulley and cable assembly to which said marking head is affixed being vertically raised and lowered and said means defining a flexible optical path extends between said emitter and said marking head for transmitting said emission beam from said laser to said marking head.

6. The apparatus of claim 1 wherein said flexible optical path comprises articulating arm consisting of at least two sections of tubing pivotally connected by a knuckle joint, the bore of each of said tubes having an emission beam reflective surface, a beam reflective mirror being mounted in said knuckle joint for rotation with respect to one of tube sections for reflection of the incident emission beam from one section to another irrespective of the relative positions of the sections.

7. The apparatus of claim 1 wherein said flexible optical path comprised one or more flexible optical fibers for transmission of said emission beam from said laser source to said marking head.

8. A method for etching a surface of automotive safety glass utilizing high intensity light as an inscribing agent, said method comprising the steps of:

a. creating a control signal representing an image to be inscribed on said surface;

b. transmitting said signal to a remote marking head and to an emitter including a laser and generating a laser emission beam of high intensity light, said laser emission beam being maintained between a power level sufficient to etch said surface and less than a level at which said beam penetrates said surface and effects the structural integrity of said automotive safety glass being etched;

c. conducting said emitted beam though a flexible optical path to a remote marking head, d. positioning said marking head adjacent to a surface area of said automotive safety glass and directing said laser emission responsive to said control signal;

thereby to scribe an image representing the input data into the surface.

9. The method of claim 8 wherein said laser emission beam is maintained between a power level of 10 watts and 20 watts.

10. The method of claim 8 wherein said laser emission beam is maintained at a power level of 20 watts.

11. The method of claim 8 wherein said laser emission is generated by a laser selected from the group consisting of eximer and $CO_2$ lasers.

12. The method of claim 8 wherein said laser emission is generated by a $CO_2$ laser.

* * * * *